United States Patent
Laffey et al.

(10) Patent No.: US 6,886,138 B2
(45) Date of Patent: Apr. 26, 2005

(54) DIRECTING USERS' ATTENTION TO SPECIFIC ICONS BEING APPROACHED BY AN ON-SCREEN POINTER ON USER INTERACTIVE DISPLAY INTERFACES

(75) Inventors: Patrick Justin Laffey, Cedar Park, TX (US); Gerald Francis McBrearty, Austin, TX (US); Jessica Kelley Murillo, Hutto, TX (US); Johnny Meng-Han Shieh, Austin, TX (US); Kim-Khanh Vu Tran, Austin, TX (US); Scott Trieu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 09/899,604

(22) Filed: Jul. 5, 2001

(65) Prior Publication Data
US 2003/0007015 A1 Jan. 9, 2003

(51) Int. Cl.[7] .................................................. G09G 5/00
(52) U.S. Cl. ........................ 715/860; 715/856; 715/859; 715/860; 715/862; 715/837
(58) Field of Search ................................. 345/846, 856, 345/859, 860, 861, 862, 835, 837, 810, 761, 763, 764, 790, 821, 823

(56) References Cited

U.S. PATENT DOCUMENTS

| | | | | | |
|---|---|---|---|---|---|
| 5,754,177 | A | * | 5/1998 | Hama et al. | 345/862 |
| 5,778,382 | A | * | 7/1998 | Hatori | 707/102 |
| 6,211,876 | B1 | * | 4/2001 | Ackermann et al. | 345/835 |
| 6,771,391 | B1 | * | 8/2004 | Konishi et al. | 358/1.9 |
| 2001/0030668 | A1 | * | 10/2001 | Erten et al. | 345/863 |
| 2002/0075333 | A1 | * | 6/2002 | Dotta et al. | 345/862 |

* cited by examiner

Primary Examiner—Heather R. Herndon
Assistant Examiner—Mylinh Tran
(74) Attorney, Agent, or Firm—Diana C. Roberts; Jerry Kraft; Volel Emile

(57) ABSTRACT

In an interactive display interface, an implementation for highlighting all icons in any set of a plurality of the icons, wherein each icon in the set is within a predetermined distance of an approaching pointer or cursor. In other words, the point of the pointer or cursor may be considered to be surrounded by a circular halo with a radius of said predetermined distance. The user moves the cursor in a standard manner. However, if the icons that the moving cursor is approaching are so densely spaced that more than one icon comes within the halo, then all of the icons within this set of the plurality of icons is highlighted to give the user a more distinct choice. The highlighting of each of the highlighted icons is ended when the pointer moves outside of the predetermined distance or halo radius.

27 Claims, 7 Drawing Sheets

DIRECTING USERS' ATTENTION TO SPECIFIC ICONS BEING APPROACHED BY AN ON-SCREEN POINTER ON USER INTERACTIVE DISPLAY INTERFACES

CROSS REFERENCE

United States Patent Applications:
TEMPORARILY MOVING ADJACENT OR OVERLAPPING ICONS AWAY FROM SPECIFIC ICONS BEING APPROACHED BY AN ON-SCREEN POINTER ON USER INTERACTIVE DISPLAY INTERFACES and ALTERNATE REDUCED SIZE ON-SCREEN POINTERS FOR ACCESSING SELECTABLE ICONS IN HIGH ICON DENSITY REGIONS OF USER INTERACTIVE DISPLAY INTERFACES having the same inventors and assignee of the present application and filed concurrently herewith and hereby incorporated by reference.

TECHNICAL FIELD

The present invention relates to user interactive computer supported display technology and particularly to such user interactive systems and methods which are user friendly and provide computer users with an interface environment that is easy to use, even in displays which are crowded and cluttered with icons.

BACKGROUND OF RELATED ART

The past decade has been marked by a technological revolution driven by the convergence of the data processing industry with the consumer electronics industry. This advance has been even further accelerated by the extensive consumer and business involvement in the Internet over the past several years. As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

In order for the vast computer supported industries and market places to continue to thrive it will be necessary for increasing numbers of workers and consumers who are limited in computer skills to become involved with computer interfaces.

Despite all of the great changes that have been made in the computer industry, the screen cursor controlled manually by the user still remains the primary human-computer interface. The user still commands the computer primarily through manual pointing devices such as mice, joy sticks and trackballs that control the on-screen cursor movements. It must be noted that the principles involved in such pointing devices were developed over a generation ago when most of the people involved in interfaces to computers were computer professionals who were willing to invest great amounts of time in developing computer skills. It is very possible that had computers originally been the mass consumer, business and industry implements that they are today, user interfaces which were much easier and required less skill to use would have been originally sought and developed. Nonetheless, the manually controlled cursor movement devices are our primary access for cursor control. The present invention is directed to making mice, trackballs and like cursor control devices more user friendly and effective.

Icons in Graphical User Interfaces (GUIs) are, of course, the primary access through which the user may interactively select substantially all computer functions and data. Thus, the number of icons that the user has to contend with in the navigation of his cursor to his target icon has been greatly increasing. These may be arranged in many layers of windows. In certain portions of the users' display screen, there may be dense populations of icons. The icons may overlap or be stacked one on the other.

In addition, the users' desktop display screens have been increasing in size to thereby provide the user with the luxury of some room for icon spacing to visually separate icons. On the other hand, users are extensively using laptop computers and palm-type devices, including Personal Digital Assistants (PDAs) and even cell phone displays to supplement their desktops. Thus, the desktop displays need to be replicated on these smaller screen devices to thereby make the icons even more closely spaced. In any event, whether it be on the desktop, laptop of smaller screen device, the selection of icons or like displayed objects and items from crowded screen areas presents a problem.

SUMMARY OF THE PRESENT INVENTION

The present invention offers an implementation for the interactive selection of icons from display screen areas crowded with a high density of icons. The invention provides a user activated cursor control device, such as a trackball or mouse, which is movable in the four orthogonal directions. The control device is connected to the computer which includes means for converting the user activated orthogonal movements into cursor or pointer movements in said four directions. The key to the present invention is in the provision of means for highlighting all items in any set of a plurality of said items wherein each item in the set is within a predetermined distance of said approaching pointer. In other words, the point of the pointer or cursor may be considered to be surrounded by a circular halo with a radius of said predetermined distance. The user moves the cursor in a standard manner. However, if the icons that the moving cursor is approaching are so densely spaced that more than one, i.e. a plurality of icons come within the halo, then all of the icons within this set of the plurality of icons is highlighted to give the user a more distinct choice. The invention provides means for ending said highlighting of each of said highlighted icons when the pointer moves outside of said predetermined distance or halo radius. Also provided are means for ending said highlighting of each of said highlighted icons after a predetermined period of time.

In accordance with an aspect of the invention, means are provided for sequentially highlighting each icon in the set instead of simultaneously highlighting the set of icons. This is particularly effective where the icons are overlapped or stacked, or where the region in which the icons are located has such a high icon density, i.e. surrounding icons are so close that it is not possible for the user to distinguish one highlighted cursor from the other. In such a situation, there are provided means for sequentially highlighting said set of icons by highlighting each icon in the set for a defined period of time, in combination with further means enabling the user selection of each sequentially highlighted item during said period of time.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
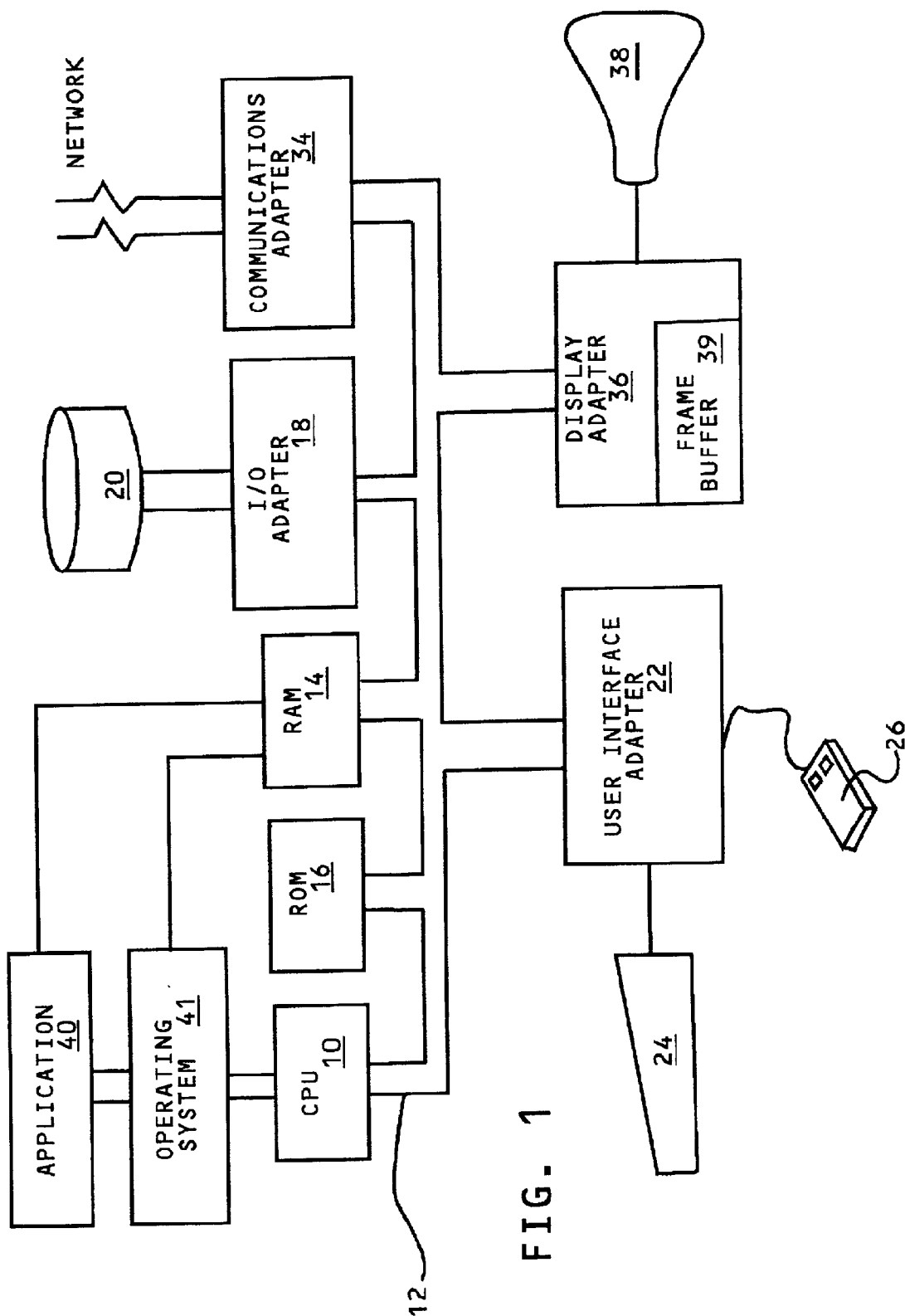
FIG. 1 is a block diagram of a generalized data processing system including a central processing unit that provides the computer controlled interactive display system that may be used in practicing the present invention.

Referring to FIG. 1, a typical data processing system is shown which may function as the computer controlled display terminal used in implementing the system of the present invention of selectively highlighting a set of icons in a high icon density display area wherein each icon in the set is within a predetermined distance halo of the point of an approaching cursor. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or AIX operating systems. An application program that controls the highlighting of the set of icons within the approaching cursor halo, to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet or World Wide Web ("Web") (the terms Internet and Web are used interchangeably throughout this application). I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 2:
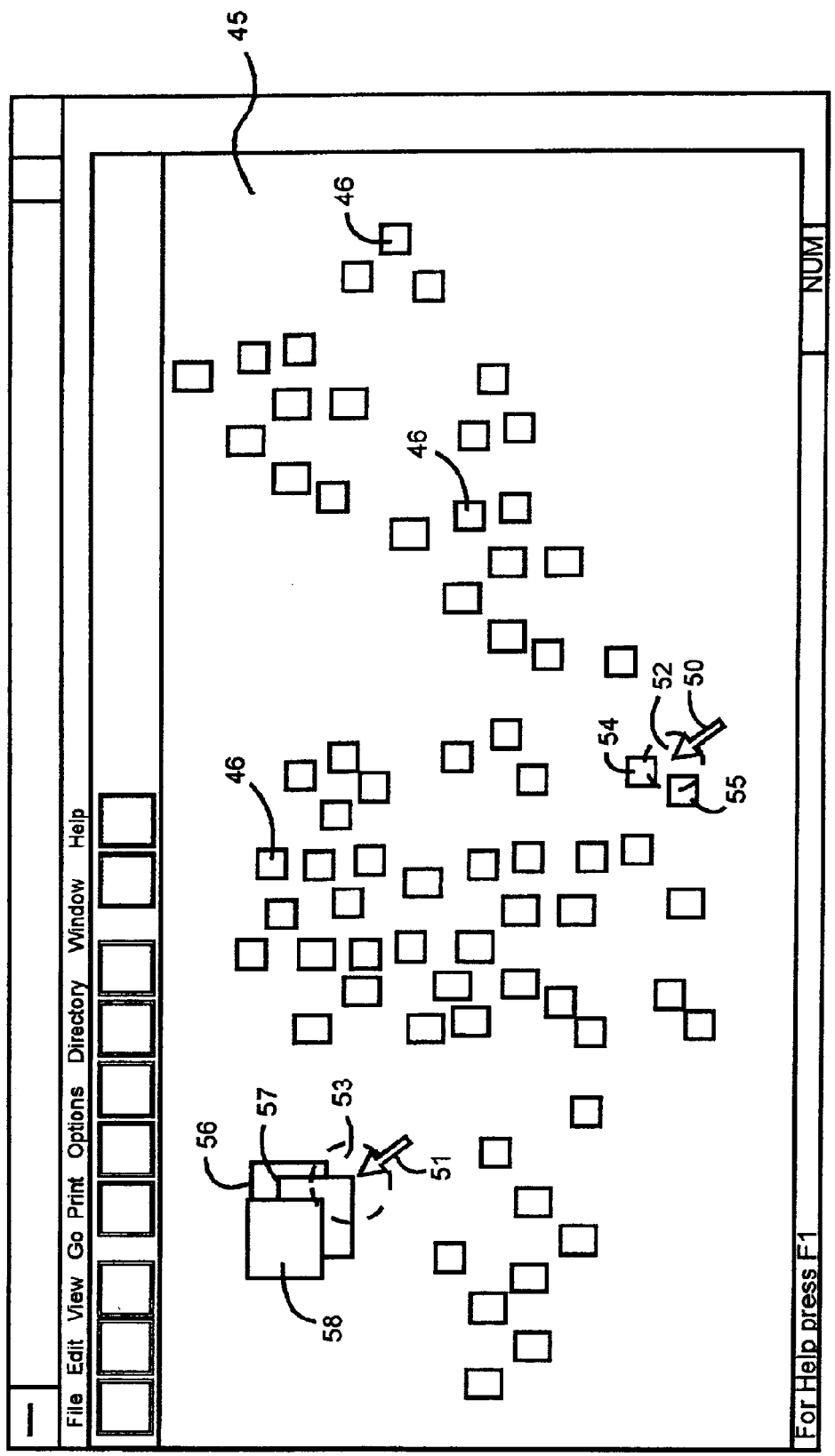
FIG. 2 is a diagrammatic view of a display screen illustrating two examples of cursor movements into target regions that are crowded with high density icon populations so as to illustrate two aspects of the invention.

With reference to FIG. 2, the display screen shown has a great number of icons 46 (simplified to just squares for illustration). Actually, the number of icons has also been minimized for this example. It is understood that there may be icons arranged in patterns of greater or lesser icon density, i.e. greater spacing between icons. Thus, as the cursor 51 or 52 is moved along and approaches an icon 46 which is adequately spaced from its adjacent icons so that a user would not be expected to encounter any difficulty in distinguishing the icon from adjacent icons, then the highlighting function of the invention need not be invoked and the icon may be approached and selected in the standard way.

Figure 3:
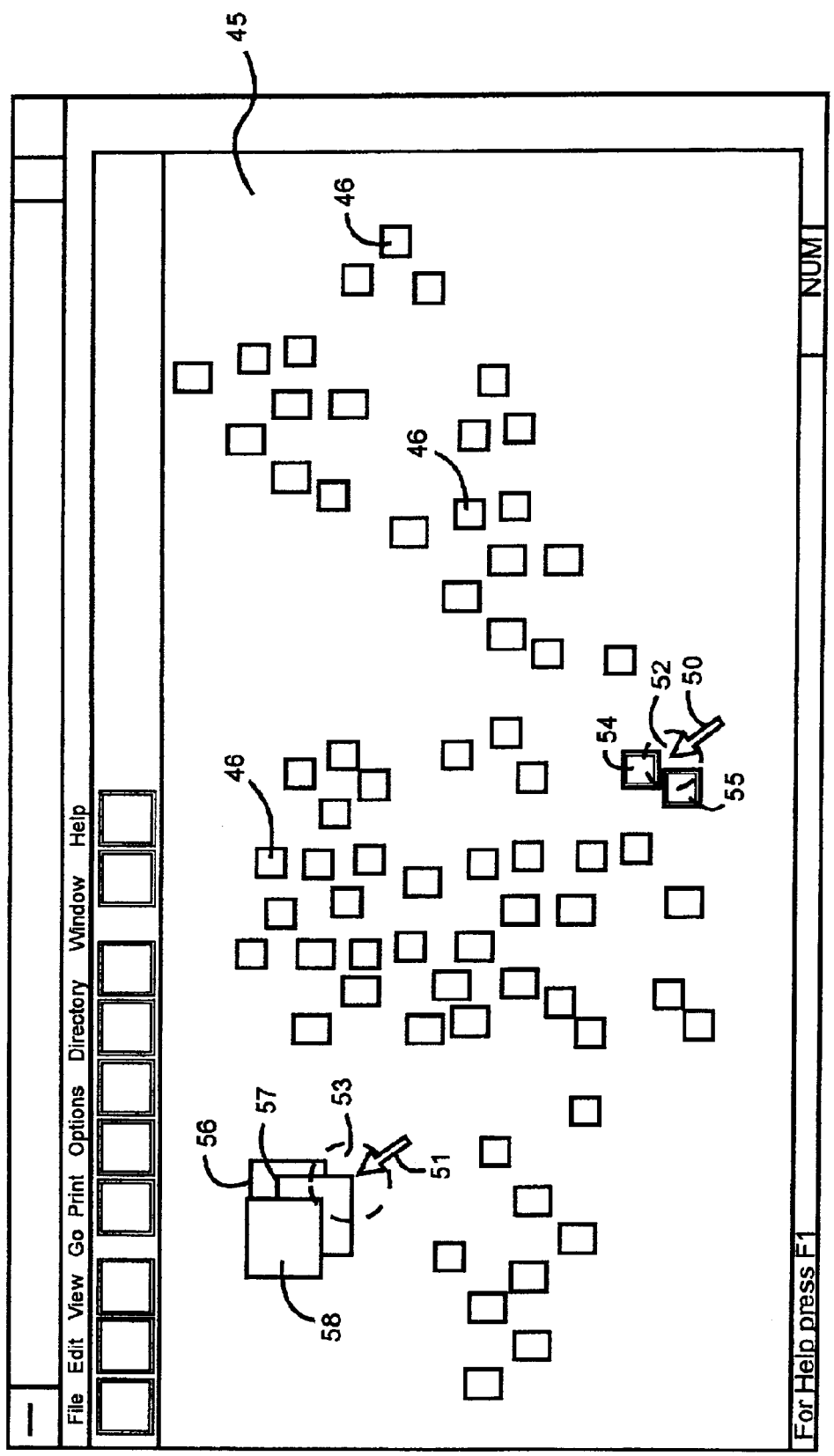
FIG. 3 is the diagrammatic display view of FIG. 2 but illustrating the highlighting of a set of icons which are simultaneously within the halo of the cursor point.

However, the icon density adjacent to the target icon may be so great that the highlighting function will need to be invoked in order to help the user distinguish his target icon. This may be accomplished by selecting a predeterminable minimum distance or spacing between icons necessary to distinguish between adjacent icons. This distance may then be considered as a radius of a circular halo surrounding the tip of a moving cursor, i.e. halo 52 surrounding the point of cursor 50 or halo 53 surrounding the point of cursor 51. It should be noted that there would usually be a single cursor on a display screen. We have replicated the cursor so as to illustrate two different possible icon arrangements which could give rise to the present invention. Thus, cursor 51 could be considered to be cursor 50 in a different position. With the position of cursor 50, there are two icons 54 and 55 within its halo 52. Thus, as shown in FIG. 3, icons 54 and 55 will be considered to be too close together and they will be highlighted as shown in FIG. 3 so as to give the user a clear distinction between icons. Both icons 54 and 55 are highlighted as illustrated by the boarders surrounding the icons. It is noted that these two icons are simultaneously highlighted. In most situations, it is preferable that the highlighting is carried out sequentially icon by icon, as will be hereinafter described. However, in the display of FIG. 3, icons 54 and 55 are sufficiently spaced from surrounding icons that the user can distinguish between icons 54 and 55 when they are both highlighted.

Once, the user selects one of the highlighted icons, the highlighting may conveniently be turned off, or, if the cursor 50 moves without a user selection to a another position where there are no longer more than that one icon within halo 52, the highlighting may be removed.

The highlighting may be in any convenient form. The highlighted icons may change color, be brighter, blink, have a different border or even appear to rise above the plane of the display screen background.

Now, with respect to cursor 51, FIG. 3, it has encountered three icons: 56, 57 and 58 within its halo 53. With such a stacked or overlapping group of icons, rather than highlight all overlapping icons at the same time, it is preferred to sequentially highlight each icon in the set, as will be hereinafter described. Icons 54 and 55 could also have been sequentially highlighted if the user or the set up process parameters found them to be so closely spaced relative to each other and/or other adjacent icons that the user could not easily select between even the highlighted icons.

Figure 5:
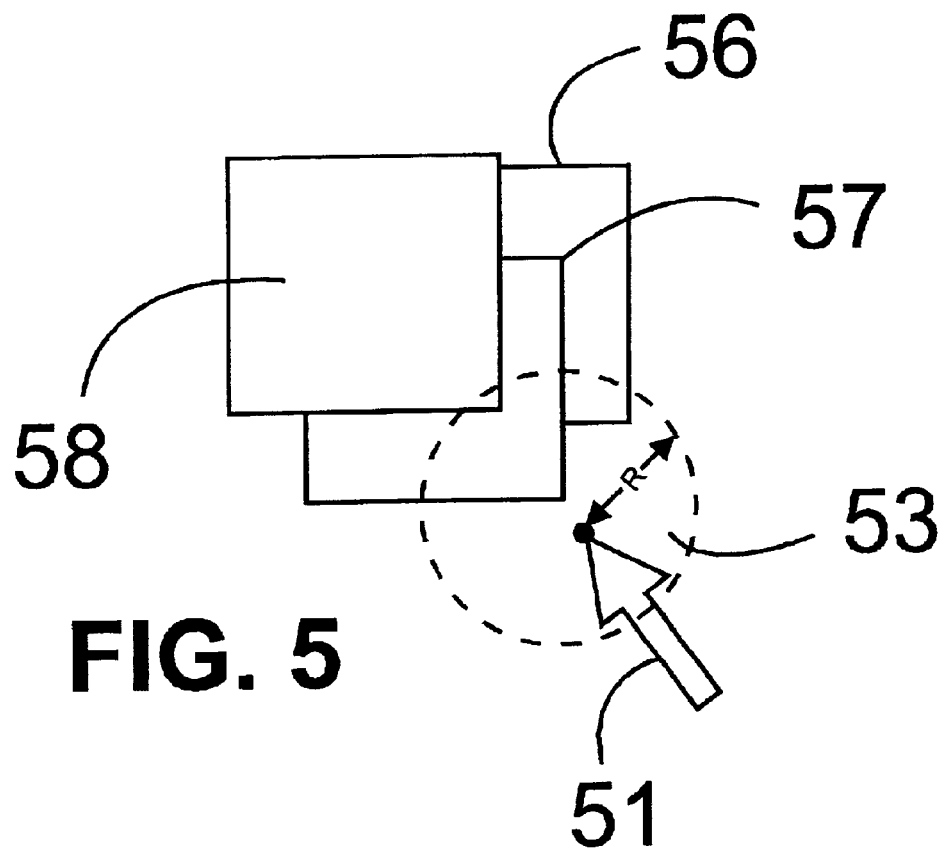
FIG. 5 is a magnified portion of the view of FIG. 3 illustrating the set of overlapping icons simultaneously within the halo of the cursor point.
Figure 4:
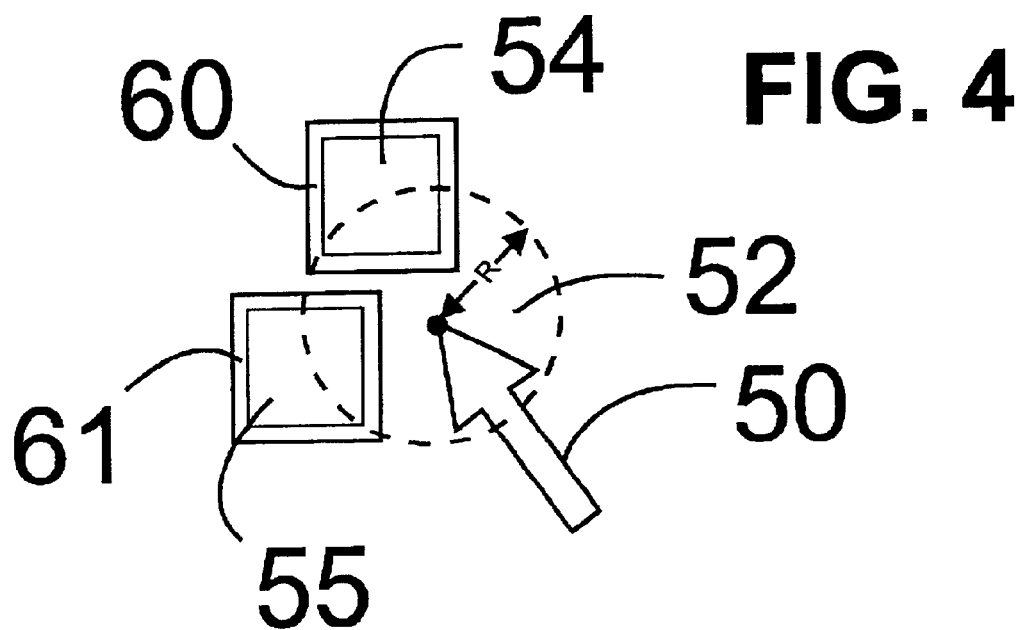
FIG. 4 is a magnified portion of the view of FIG. 3 illustrating the highlighting of the set of icons simultaneously within the halo of the cursor point.

Magnified views of cursors 50 and 51 and their associated halos 52 and 53 are respectively shown in FIGS. 4 and 5. The status of FIG. 4 has already been described with respect to FIG. 3. Halo 52 has radius R, and since plural icons 54 and 55 fall within this halo, they are simultaneously highlighted as indicated by borders 60 and 61. Likewise overlapping icons 56–58, FIG. 5, fall within halo 53 of cursor 51. They will be sequentially highlighted as in the sequence in FIGS. 6 through 8. First, icon 58 is highlighted as indicated by border 62, FIG. 6. Then, icon 57 is highlighted as indicated by border 63, FIG. 7. Finally, icon 56 is highlighted as indicated by border 64, FIG. 8.

Figure 6:
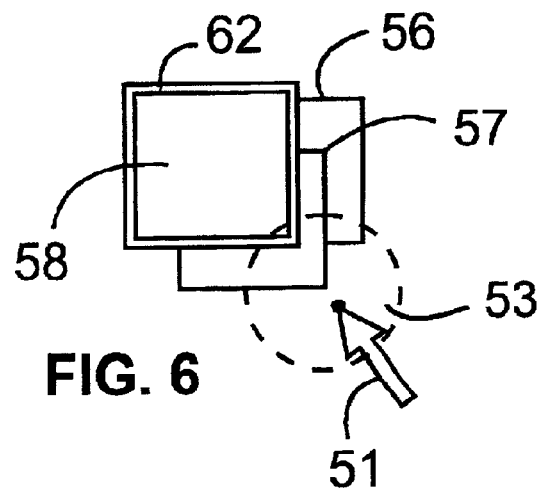
FIG. 6 is the view of overlapping icons of FIG. 5 illustrating the sequential highlighting of the first icon in the set.
Figure 7:
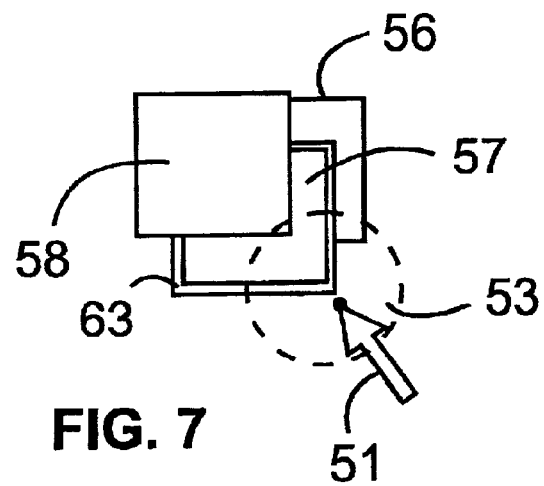
FIG. 7 is the view of overlapping icons of FIG. 5 illustrating the sequential highlighting of the second icon in the set.
Figure 8:
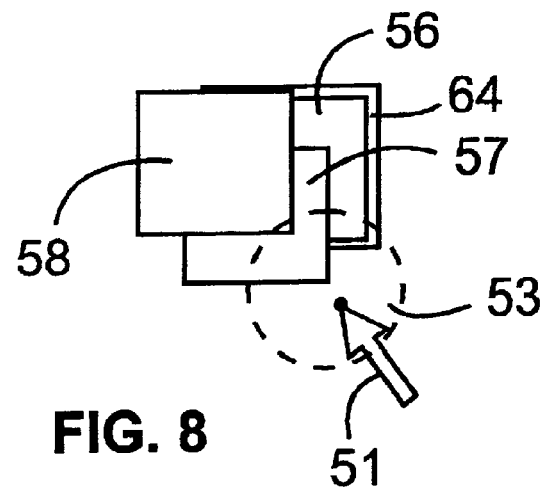
FIG. 8 is the view of overlapping icons of FIG. 5 illustrating the sequential highlighting of the third icon in the set.

In the sequence of highlighting shown in FIGS. 6 through 8, the cursor is shown to be in the initial position during the sequential highlighting of icons 56 through 58. The sequential highlighting process may be set up to proceed automatically, i.e. as soon as it is determined that cursor 51 is within halo 53 and that there is insufficient separation in a cluster of icons for cursor 51 to select a target icon from icons 56 through 58, the highlighting sequence is automatically stepped through. Also, because of the closeness of the separation, each icon is preferably only activated, i.e. enabled for selection, during its highlighting. Thus, the cursor may remain stationary during the highlighting sequence and when the user sees that his target icon is highlighted, he clicks on an appropriate mouse button to make the selection. Also, the sequential highlighting process need not be automatic. A first icon in the cluster or set may be highlighted, e.g. the icon closest to the cursor. The user may then select it by clicking on one of his mouse buttons or step to highlight the next icon in the sequence by clicking on the other of his mouse buttons. The user may also sequentially step through the sequential highlighting of the icons in the cluster or set by moving his cursor 51 so that the cursor is sequentially closest to each of the icons in the cluster and that closest icon is thereby highlighted. Since only the highlighted icon is enabled for selection, the user need not be concerned with touching his target icon to make a selection; he only need click on his mouse to select the icon during the time period that the icon is highlighted.

Figure 9:
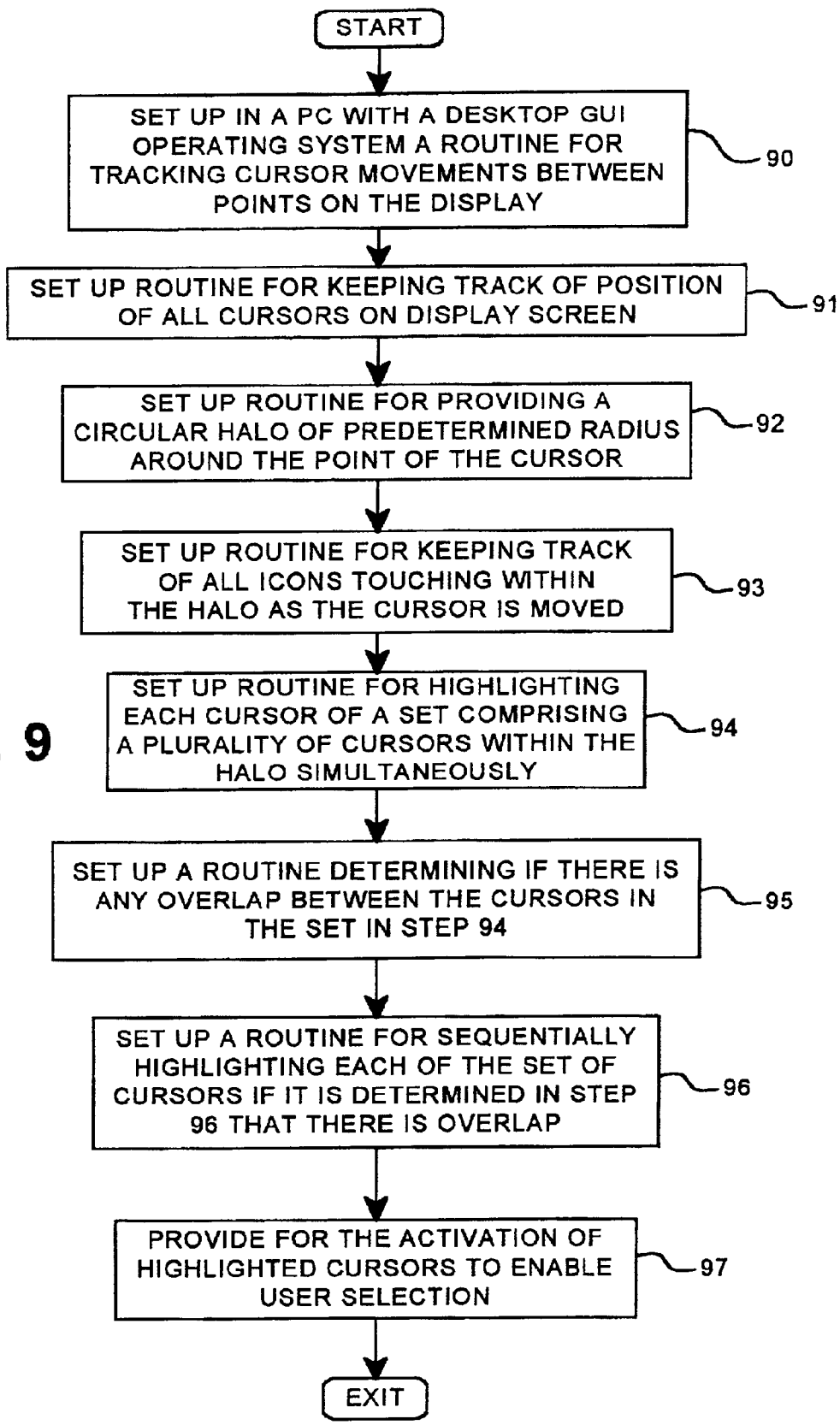
FIG. 9 is a flowchart of the program steps involved in setting up a process wherein cursor movement into regions on a display screen with high icon density resulting in the highlighting of a set of icons.
Figure 10:
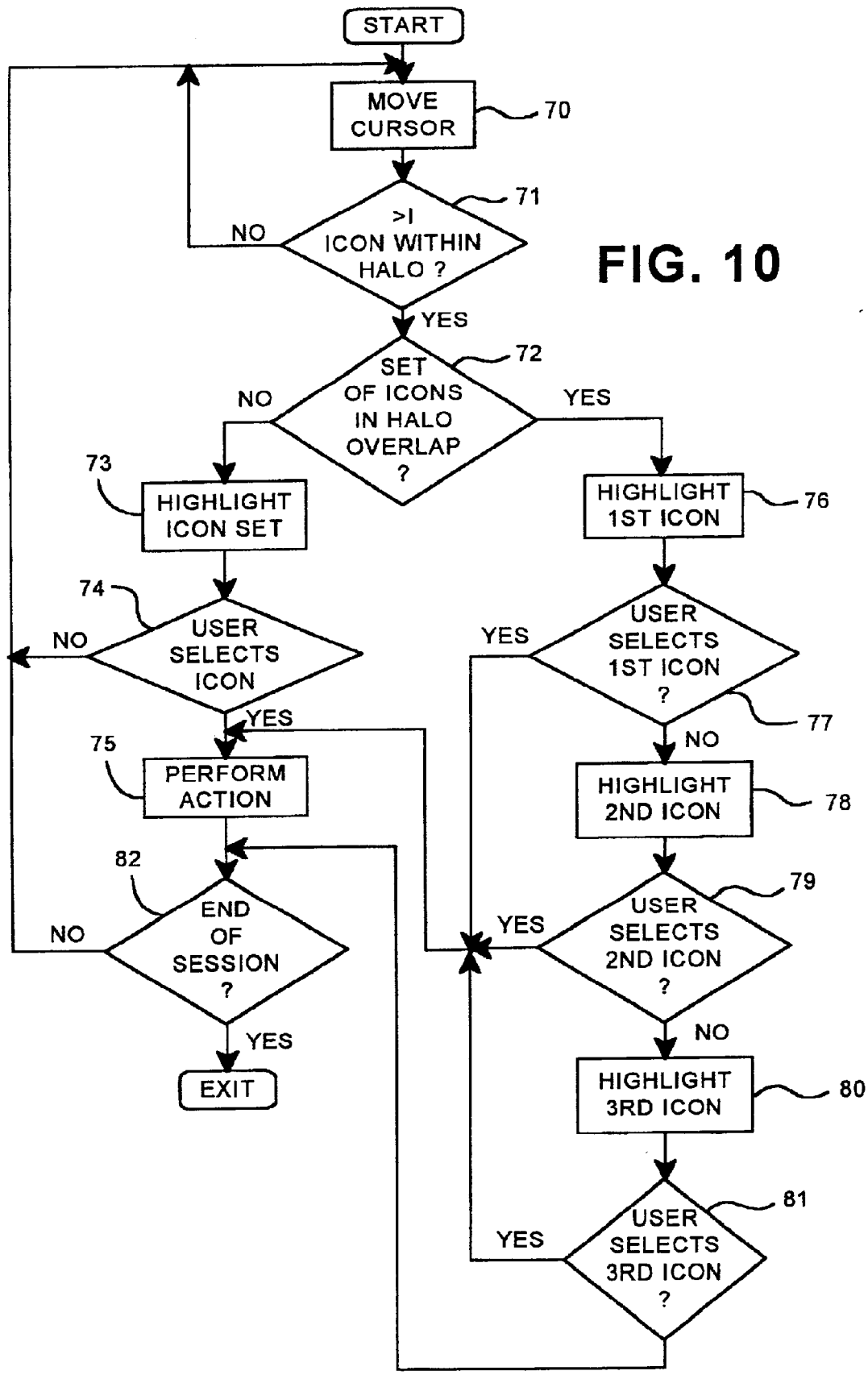
FIG. 10 is a flowchart of the steps involved in an illustrative run of the process set up in FIG. 9.

Now, with reference to FIGS. 9 and 10, we will describe a process implemented by the present invention in conjunction with the flowcharts of these figures. FIG. 9 is a flowchart showing the development of a process according to the present invention for distinguishing between closely spaced icons in a high icon density region of a display screen. In a personal computer set up with a desktop GUI and an operating system, a routine is provided for tracking cursor movements between points on a display screen, step 90. A routine is provided for tracking cursor positions on the display screen, step 91. A routine is set up for providing a circular halo with a predetermined radius around the cursor point, step 92. Then, a routine is set up for keeping track of all icons within a cursor halo as the cursor is moved in navigation on the screen, step 93. A routine is set up for simultaneously highlighting each icon in the set of icons within a halo as a cursor is moved, step 94. A routine is set up for determining if there is sufficient spacing between icons within the halo and between these icons and adjacent icons that these targeted or approached icons may be simultaneously highlighted, step 95. Certainly, if there is overlap between icons, there is insufficient spacing and these should be sequentially highlighted. On the other hand, as shown in FIGS. 3 and 4, the targeted icons may be close to each other but so spaced from other adjacent icons that simultaneous highlighting is appropriate. The procedure may provide for the interactive user to click on a simple display switch or button to choose that the target icons be sequentially highlighted. Alternatively, the process itself may include a routine for automatically determining whether there is sufficient spacing for simultaneous highlighting. This may be based upon a combination of the dimensions of the target icons and the spacing from adjacent icons. The above cross-referenced copending application, describes an example of such a routine. Then, a routine is set up for sequentially highlighting each of a set of cursors sequentially if it is determined in step 95 that there is insufficient spacing between cursors, step 96. In step 97, provision is made to enable user selection by activating the highlighted cursors.

The running of the process will now be described with respect to FIG. 10. First, step 70, the cursor is moved in the direction of an icon that the user wishes to select. A determination is made with respect to the moving cursor as to whether there is more than one icon within the halo surrounding the point of the cursor, step 71. If No, then the normal icon selection process is followed, step 83, and then, step 70, cursor movement continues. A No determination indicates that the cursor is not moving in a dense cursor region of the display screen as discussed hereinabove. If the determination from step 71 is Yes, there is more than one icon within the halo, then, step 72, a further initial determination, as previously described, is made as to whether the set of icons within the halo are sufficiently spaced that they may be simultaneously highlighted. If Yes, then, step 73, as illustrated in FIG. 4, all of the icons in the halo set are simultaneously highlighted and a further determination is made, step 74, as to whether the user selects an icon. If No, the process is returned to step 70 where the cursor continues to move. If Yes, then, step 75, the function represented by the icon is performed. If the decision from step 72 had been No, there is insufficient spacing, e.g. where the icons in the halo overlap, then, as shown in FIGS. 6 through 8, the following steps are carried out. The first overlapping icon is highlighted, step 76, and a determination is made, step 77, as to whether the user selects the first icon. If Yes, then, step 75, the function represented by the icon is performed. If No, then the second overlapping icon is highlighted, step 78, and a determination is made, step 79, as to whether the user selects the second icon. If Yes, then, step 75, the function represented by the icon is performed. If No, then the third overlapping icon is highlighted, step 80, and a determination is made, step 81, as to whether the user selects the third icon. If Yes, then, step 75, the function represented by the icon is performed. If the decision from step 81 is No, or in any event, after step 75, a determination may conveniently be made as to whether we are at the end of the session, step 82. If Yes, the session is exited. If No, the process is returned to step 70 where the cursor continues to move.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display system, a display interface implementation for directing a user's attention to specific selectable items on display screen with crowded selectable items comprising;
   user controlled means for moving an on-screen pointer to approach said selectable items; and
   means for automatically sequentially highlighting each item in said selectable items when said approaching pointer is within a predetermined distance from said items.

2. The computer controlled user interactive display system of claim 1 wherein said selectable items are icons.

3. The computer controlled user interactive display system of claim 2 further including means for ending said highlighting of each of any highlighted icons when the pointer moves outside of said predetermined distance for said icon.

4. The computer controlled user interactive display system of claim 2 further including means for ending said highlighting of each of any highlighted icons after a predetermined period of time.

5. The computer controlled user interactive display system of claim 2:
   wherein said means for sequentially highlighting said set of icons highlight each icon in the set for a defined period of time; and
   further including means for enabling the user selection of each sequentially highlighted item during said period of time.

6. The computer controlled user interactive display system of claim 5 wherein the icons in said set overlap each other.

7. A method for directing a user's attention to specific selectable items on a display screen with crowded selectable items in computer controlled user interactive display systems comprising:
   moving an on-screen pointer to approach said selectable items; and
   automatically sequentially highlighting each item in said selectable items when said approaching pointer is within a predetermined distance from said items.

8. The method of claim 7 wherein said selectable items are icons.

9. The method of claim 8 further including the step of ending said highlighting of each of any highlighted icons when the pointer is moved outside of said predetermined distance for said icon.

10. The method of claim 8 further including the step of ending said highlighting of each of any highlighted icons after a predetermined period of time.

11. The method of claim 8 wherein said step of sequentially highlighting said set of icons highlight each icon in the set for a defined period of time; and
    further including the step of enabling the user selection of each sequentially highlighted item during said period of time.

12. The method of claim 11 wherein the icons in said set overlap each other.

13. A computer program having program code included on a computer readable medium for directing a user's attention to specific selectable items on a display screen with crowded selectable items in computer controlled user interactive display systems comprising:
    user controlled means for moving an on-screen pointer to approach said selectable items; and
    means for automatically sequentially highlighting each item in said selectable items when said approaching pointer is within a predetermined distance from said items.

14. The computer program of claim 13 wherein said selectable items are icons.

15. The computer program of claim 14 further including means for ending said highlighting of each of any highlighted icons when the pointer moves outside of said predetermined distance for said icon.

16. The computer program of claim 14 further including means for ending said highlighting of each of any highlighted icons after a predetermined period of time.

17. The computer program of claim 14 wherein said means for sequentially highlighting said set of icons highlight each icon in the set for a defined period of time; and
    further including means enabling the user selection of each sequentially highlighted item during said period of time.

18. The computer program of claim 17 wherein the icons in said set overlap each other.

19. In a computer controlled user interactive display system, a display interface implementation for directing a user's attention to specific selectable items on a display screen with crowded selectable items comprising:
    user controlled means for moving an on-screen pointer to approach a cluster of said selectable items; and
    means for automatically sequentially highlighting each item in said cluster when said approaching pointer is within a predetermined distance from said cluster.

20. In a computer controlled user interactive display system, a display interface implementation for directing a user's attention to specific selectable items on a display screen with crowded selectable items comprising:
    user controlled means for moving an on-screen pointer to approach a cluster of said selectable items;
    means for determining whether the items in said cluster have sufficient separation for said pointer to select separate items in said cluster; and
    means responsive to said determining means for automatically sequentially highlighting each item in said cluster when there is insufficient separation.

21. The computer controlled user interactive display system of claim 20 wherein each item is activated for selection when highlighted.

22. A method for a user's attention to specific selectable items on a display screen with crowded selectable items in computer controlled user interactive display systems comprising:

moving an on-screen pointer to approach a cluster of said selectable items; and automatically sequentially highlighting each item in said cluster when said approaching pointer is within a predetermined distance from said cluster.

23. A method for directing a user's attention to specific selectable items on a display screen with crowded selectable items in computer controlled user interactive display systems comprising:

moving an on-screen pointer to approach a cluster of said selectable items;

determining whether the items in said cluster have sufficient separation for said pointer to select separate items in said cluster; and automatically sequentially highlighting each item in said cluster responsive to a determination that there is insufficient separation.

24. The method of claim 23 wherein each item is activated for selection when highlighted.

25. A computer program having program code included on a computer readable medium for directing a user's attention to specific selectable items on a display screen with crowded selectable items in computer controlled user interactive display systems comprising:

user controlled means for moving an on screen pointer to approach a cluster of said selectable items; and means for automatically sequentially highlighting each item in said cluster when said approaching pointer is within a determined distance from said cluster.

26. A computer program having program code included on a computer readable medium for directing a user's attention to specific selectable items on a display screen with crowded selectable items in computer controlled user interactive display systems comprising:

user controlled means for moving an on-screen pointer to approach a cluster of said selectable items;

means for determining whether the items in said cluster have sufficient separation for said pointer to select separate items in said cluster; and means responsive to said determining means for automatically sequentially highlighting each item in said cluster when there is insufficient separation.

27. The computer program of claim 26 wherein each item is activated for selection when highlighted.

* * * * *